US006667403B2

(12) United States Patent
Wood et al.

(10) Patent No.: US 6,667,403 B2
(45) Date of Patent: Dec. 23, 2003

(54) CANDLE WAX COMPOSITIONS STABILIZED WITH UV ABSORBER-METAL COMBINATIONS

(75) Inventors: Mervin Wood, Poughquag, NY (US); James Hyun, Danbury, CT (US); Joseph Suhadolnik, Yorktown Heights, NY (US); Kevin Trainor, Brewster, NY (US); Mark Mc Cusker, Sandy Hook, CT (US); Andrea Smith, Wingdale, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/218,212

(22) Filed: Aug. 13, 2002

(65) Prior Publication Data

US 2003/0101640 A1 Jun. 5, 2003

Related U.S. Application Data

(62) Division of application No. 09/875,770, filed on Jun. 6, 2001, now Pat. No. 6,562,085.

(51) Int. Cl.[7] ............................................. C07D 249/18
(52) U.S. Cl. ....................................... 548/104; 548/106
(58) Field of Search ................................... 548/104, 106

(56) References Cited

U.S. PATENT DOCUMENTS

| | | | |
|---|---|---|---|
| 3,149,093 A | 9/1964 | Hecker et al. | 260/45.75 |
| 3,510,451 A | 5/1970 | Seki et al. | 260/45.75 |
| 3,530,084 A | 9/1970 | Potts | 260/28.5 |
| 3,597,462 A | 8/1971 | Seki et al. | 260/429.7 |
| 3,600,397 A | 8/1971 | Seki et al. | 260/299 |
| 3,856,727 A | 12/1974 | Seki et al. | 260/23 |
| 4,110,261 A | 8/1978 | Newland | 44/275 |
| 4,179,432 A | 12/1979 | Molt | 260/45.75 |
| 4,379,721 A | 4/1983 | Qualitz et al. | 106/21 |
| 4,616,051 A | 10/1986 | Paolino | 524/102 |
| 5,127,922 A | 7/1992 | Bension | 44/275 |
| 5,179,171 A | 1/1993 | Minami | 525/288 |
| 5,879,694 A | 3/1999 | Morrison et al. | 424/405 |
| 5,964,905 A | 10/1999 | Camp et al. | 44/275 |
| 6,166,218 A | 12/2000 | Ravichandran et al. | 548/257 |

FOREIGN PATENT DOCUMENTS

| | | |
|---|---|---|
| EP | 0005922 | 12/1979 |
| EP | 0359488 | 3/1990 |
| EP | 0133964 | 7/1990 |
| FR | 1457966 | 11/1966 |
| FR | 1531509 | 5/1967 |
| GB | 1191693 | 5/1970 |
| JP | 3278554 | 12/1991 |
| WO | 94/13736 | 6/1994 |
| WO | 00/22037 | 4/2000 |

OTHER PUBLICATIONS

B. B. Cooray et al., European Polymer Journal, vol. 17, p. 229 (1981).
Abstract for JP 3278554 (1991).
Ullmann's Ecyclopedia of Industrial Chemistry, vol. A5, pp. 29–30.
F. A. Ballentine et al., National Candle Association Technical Meeting Apr. 16, 1998, "Inhibiting Color Fading of Dyed Candles with CYASORB® Ligh Absorbers".
Chemlist 10589 and 8853 2002 ACS.

*Primary Examiner*—Joseph K. McKane
*Assistant Examiner*—Andrea D. Small
(74) *Attorney, Agent, or Firm*—Tyler A. Stevenson

(57) ABSTRACT

Dyes and pigments present in candle wax compositions are particularly well stabilized against color fade or color change by a combination of a UV absorber and a metal compound, particularly a tin compound. The further addition of a hindered amine or antioxidant is highly beneficial.

4 Claims, No Drawings

CANDLE WAX COMPOSITIONS STABILIZED WITH UV ABSORBER-METAL COMBINATIONS

This is a divisional of application Ser. No. 09/875,770, filed Jun. 6, 2001 now U.S. Pat. No. 6,562,085.

The instant invention pertains to stabilized candle wax compositions and a method for the stabilization of color (dyes or pigments) in candle wax compositions.

BACKGROUND OF THE INVENTION

Candles have been known for many centuries going back to the eighth century B.C. The nature of candles is described in Ullmann's Encyclopedia of Industrial Chemistry, Volume A5 at pages 29–30 where it is seen that candles are made from paraffin, beeswax and stearin as basic materials, and where a host of additives may also be present.

It is not surprising that with candles and wax becoming increasingly more important attention was paid as to how to stabilize the said materials. At the National Candle Association Meeting in Houston, 1994, R. van der Vennet presented a paper on "Antioxidants in Wax-Replacement of BHT" touting the use of Vitamin E (tocopherol) as an antioxidant to prevent the yellowing of wax when oxidized. WO 94/13736 describes the same invention.

EP 359,488 A3 and EP 133,964 B1 describe stabilized waxes used in cosmetics where the waxes are the same or similar to those used in candles.

EP 5,922 A1 describes lip cosmetics where the waxes are useful in lipsticks and are related to those useful in candles.

U.S. Pat. No. 5,879,694 describes in detail transparent gel candles both in composition and structure. The use of BHT as an antioxidant is mentioned.

At the National Candle Association Technical Meeting on Apr. 16, 1998, F. A. Ballentine et al., presented a paper entitled "Inhibiting Color Fading of Dyed Candles with CYASORB®Light Absorbers" in which the general theories of thermal oxidation and photodegradation are discussed along with data on the effect of light absorbers on color stability of dyed candle waxes. The light absorbers compared are 4-octyloxy-2-hydroxybenzophenone UV-531; 4-methoxy-2-hydroxybenzo-phenone UV-9; 2-(2-hydroxy-5-methylphenyl)-2H-benzotriazole UV-5365; 2-(2-hydroxy-5-tert-octyl-phenyl)-2H-benzotriazole UV-5411 and 2-(2-hydroxy-3,5-di-tert-amylphenyl)-2H-benzotriazole UV-2337).

U.S. Pat. No. 5,964,905 teaches dyed and scented candle gels containing triblock copolymers and a hydrocarbon oil of high flash point. This reference teaches that a light (UV) absorber may be used to improve the shelf stability of the candle color when exposed to visible or ultraviolet light. Two preferred absorbers are ethylhexyl p-methoxycinnamate (PARSOL® MCX, Roche) and 2-(2-hydroxy-5-tert-octylphenyl)-2H-benzotriazole (CYASORB® 5411, Cytec).

WO 00/22037 teaches the stabilization of solid, shaped and colored wax articles, including candles, using a malonate UV absorber which may optionally contain a hindered amine moiety as part of the malonate compound structure. The wax articles are dyed with a variety of oil soluble dyes and pigments. The samples protected by dimethyl p-methoxy-benzylidinemalonate exhibited better resistance to discoloration than did samples stabilized with selected benzotriazole or benzophenone UV absorbers.

Japanese Hei 3-278554 teaches that wax crayons (drawing materials) colored by organic pigments can be stabilized by a hindered amine and/or benzotriazole.

In respect to wax stabilization, the use of selected hindered amines and/or benzotriazole UV absorbers is also known in the prior art as seen in U.S. Pat. Nos. 3,530,084; 4,379,721; 4,616,051; 5,964,905; 6,221,115 and 6,296,674 and in copending application Ser. No. 09/741,583.

French 1,457,966 describes aluminum, boron, titanium, silicon, tin, phosphorus and antimony complexes with selected benzotriazole UV absorbers as light stabilizers for textiles.

French 1,487,752 teaches tin complexes of benzotriazoles, benzophenones and benzoates as useful light stabilizers for synthetic resins such as polypropylene and polyacrylonitrile.

U.S. Pat. Nos. 3,600,397 and 3,856,727 disclose tin complexes with benzotriazoles for protecting a host of synthetic resins such as polyolefins against degradation by ultraviolet light.

French 1,531,509 teaches tin or silicon complexes of benzotriazoles as stabilizers for poly(vinyl chloride).

U.S. Pat. No. 3,149,093 describes improved processability for polypropylene by use of organotin mercaptides, phenolic antioxidants and organic phosphites. There is no mention of protection against ultraviolet irradiation.

B. B. Cooray and G. Scott in European Polymer Journal, 17, 229 (1981) teach the mechanism of antioxidant action and synergism between tin stabilizers and polymer-bound antioxidants in the UV stabilization of poly(vinyl chloride).

U.S. Pat. No. 4,179,432 discloses the stabilization of polypropylene compositions against ultraviolet light by use of benzophenone UV absorbers and various tin compounds.

U.S. Pat. No. 3,510,451 teaches the stabilization of polypropylene against heat and light degradation by use of a combination of a tin complex of a benzophenone or benzotriazole in concert with a phosphite and phenolic antioxidant.

None of these references teach the superior performance provided when a UV absorber is used in conjunction with a metal compound to stabilize a dyed or pigmented candle wax composition.

OBJECTS OF THE INVENTION

An object of the invention is to provide candle wax compositions stabilized with the combination of a UV absorber with a metal compound.

Another object of the invention is to provide a method for the stabilization of a dyed or pigmented candle wax composition by the combination of a UV absorber with a metal compound, with or without a hindered amine stabilizer, or with or without an antioxidant.

Another object of the invention is to provide new benzotriazole-metal complex or benzotriazole-metal salt compounds.

DETAILED DISCLOSURE

The instant invention pertains to a stabilized composition which comprises
(a) candle wax and
(b) an effective stabilizing amount of
 (i) at least one compound selected from the group consisting of the UV absorbers and
 (ii) a metal selected from groups 4, 6, 7, 8, 9, 10, 11, 12, 13, 14, 15 and 16 of the periodic table;
where the amount of metal present is from about 15 ppb to about 3400 ppm by weight of metal based on the candle wax.

The level of metal present is for example from about 15 ppb to about 3.4 ppm by weight of metal based on the candle wax, for example from about 15 ppb to about 600 ppb by weight of metal based on the candle wax.

The metal of component (ii) is present in the compositions of this invention in any form possible, for example in the form of a UVA-metal complex or a UVA-metal salt, in the form of an organometallic compound such as a metal carboxylate or metal alkoxide, or in the form of a metal salt, or in the form of the pure metal. The levels of metal discussed above are based on metal alone (on the metal itself).

Organometallic complexes or salts such as the present UVA-metal complexes or UVA-metal salts are defined structurally as understood in the art.

The UV absorbers, or ultraviolet light absorbers (UVA's), of component (i) are for example selected from the group consisting of benzotriazole, benzophenone, α-cyanoacrylate, oxanilide, s-triazine, cinnamate, malonate, benzoate, salicylate and benzoxazin-4-one ultraviolet light absorbers.

The terms ppb and ppm are parts per billion and parts per million, respectively.

In another embodiment, the UV absorber of component (i) is a benzotriazole, a benzophenone or an s-triazine.

In still another embodiment, the UV absorber of component (i) is a benzotriazole.

The UV absorbers are well known in the field of stabilization of substrates from degradation caused by exposure to actinic radiation. Examples of UV absorbers which may be used beneficially in candles include the following:

(a) 4-octyloxy-2-hydroxybenzophenone;
(b) 4-methoxy-2-hydroxybenzophenone;
(c) 2-(2-hydroxy-5-methylphenyl)-2H-benzotriazole;
(d) 2-(2-hydroxy-5-tert-octylphenyl-2H-benzotriazole;
(e) 2-(2-hydroxy-3,5-di-tert-amylphenyl)-2H-benzotriazole;
(f) octyl 3-(benzotriazol-2-yl)-5-tert-butyl-4-hydroxyhydrocinnamate;
(g) 2-(2-hydroxy-3,5-di-tert-butylphenyl)-2H-benzotriazole;
(h) 2-(2-hydroxy-5-tert-butylphenyl)-2H-benzotriazole;
(i) 5-chloro-2-(2-hydroxy-3,5-di-tert-butylphenyl)-2H-benzotriazole;
(j) 5-chloro-2-(2-hydroxy-3-tert-butyl-5-methylphenyl)-2H-benzotriazole;
(k) 2-(2-hydroxy-3-sec-butyl-5-tert-butylphenyl)-2H-benzotriazole;
(l) 2-(2-hydroxy-4-octyloxyphenyl)-2H-benzotriazole;
(m) 2-(2-hydroxy-3-dodecyl-5-methylphenyl)-2H-benzotriazole;
(n) 2-[2-hydroxy-3,5-di(α,α-dimethylbenzyl)phenyl]-2H-benzotriazole;
(o) 2-[2-hydroxy-3-(α,α-dimethylbenzyl)-5-tert-octylphenyl]-2H-benzotriazole;
(p) 2-{2-hydroxy-3-tert-butyl-5-[2-(omega-hydroxy-octa(ethyleneoxy)carbonyl)ethyl]phenyl}-2H-benzotriazole;
(q) 2-{2-hydroxy-3-tert-butyl-5-[2-(octyloxy)carbonyl)ethyl]phenyl}-2H-benzotriazole;
(r) 2-ethylhexyl p-methoxycinnamate;
(s) 4-methoxy-2,2'-dihydroxybenzophenone;
(t) 4,4'dimethoxy-2,2'-dihydroxybenzophenone;
(u) 2,4-bis(2,4-dimethylphenyl)-6-(2-hydroxy-4-octyloxyphenyl)-s-triazine;
(v) 2,4-diphenyl-6-(2-hydroxy-4-hexyloxyphenyl)-s-triazine;
(w) 2,4-bis(2,4-dimethylphenyl)-6-[2-hydroxy-4-(3-do-tri-decyloxy-2-hydroxypropoxy)phenyl]-s-triazine; and
(x) 2,4-bis(2,4-dimethylphenyl)-6-[2-hydroxy-4-(3-do-tri-decyloxy-2-hydroxypropoxy)-5-α-cumylphenyl]-s-triazine.

In another embodiment, the UV absorber is
(a) 4-octyloxy-2-hydroxybenzophenone;
(b) 4-methoxy-2-hydroxybenzophenone;
(d) 2-(2-hydroxy-5-tert-octylphenyl-2H-benzotriazole;
(o) 2-[2-hydroxy-3-(α,α-dimethylbenzyl)-5-tert-octylphenyl]-2H-benzotriazole;
(p) 2-{2-hydroxy-3-tert-butyl-5-[2-(omega-hydroxy-octa(ethyleneoxy)carbonyl)ethyl]phenyl}-2H-benzotriazole; or
(q) 2-{2-hydroxy-3-tert-butyl-5-[2-(octyloxy)carbonyl)ethyl]phenyl}-2H-benzotriazole.

The present compositions may optionally comprise a compound selected from the group of the hindered amine light stabilizers (HALS). In particular, the present compositions may comprise at least one hindered amine stabilizer selected from the group consisting of hindered amines substituted on the N-atom by an alkoxy or cycloalkoxy moiety, hindered amines substituted on the N-atom by an alkoxy which is further substituted with an hydroxy group, and conventional hindered amines where the N-atom is substituted by hydrogen, alkyl, acyl and the like.

The hindered amines substituted on the N-atom by an alkoxy or a cycloalkoxy moiety are well known in the art. These are described in detail in U.S. Pat. No. 5,204,473, the relevant parts of which are incorporated herein by reference.

The hindered amines substituted on the N-atom by an alkoxy, cycloalkoxy or benzyloxy moiety which are useful in the instant invention include the following:

(a) bis(1-octyloxy-2,2,6,6-tetramethylpiperidin-4-yl) sebacate;
(b) bis(1-cyclohexyloxy-2,2,6,6-tetramethylpiperidin-4-yl) sebacate;
(c) 1-cyclohexyloxy-2,2,6,6-tetramethyl-4-octadecylaminopiperidine;
(d) 2,4-bis[(1-cyclohexyloxy-2,2,6,6-tetramethylpiperidin-4-yl)butylamino]-6-(2-hydroxyethyl-amino)-s-triazine;
(e) bis(1-cyclohexyloxy-2,2,6,6-tetramethylpiperidin-4-yl)adipate;
(f) the oligomeric compound which is the condensation product of 4,4'-hexamethylene-bis(amino-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine;
(g) the oligomeric compound which is the condensation product of 4,4'-hexamethylene-bis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine;
(h) 1-methoxy-4-hydroxy-2,2,6,6-tetramethylpiperidine;
(i) 1-octyloxy-4-hydroxy-2,2,6,6-tetramethylpiperidine;
(j) 1-cyclohexyloxy-4-hydroxy-2,2,6,6-tetramethylpiperidine;

(k) 1-methoxy-4-oxo-2,2,6,6-tetramethylpiperidine;

(l) 1-octyloxy-4-oxo-2,2,6,6-tetramethylpiperidine;

(m) 1-cyclohexyloxy-4-oxo-2,2,6,6-tetramethylpiperidine, (n) bis(1-heptyloxy-2,2,6,6-tetramethylpiperidin-4-yl) sebacate, (o) bis(1-nonyloxy-2,2,6,6-tetramethylpiperidin-4-yl) sebacate, (p) bis(1-dodecyloxy-2,2,6,6-tetramethylpiperidin-4-yl) sebacate, or (q) N,N',N",N'"-tetrakis[[4,6-bis(butyl-1-octyloxy-2,2,6,6-pentamethylpiperidin-4-yl)-amino-s-triazin-2-yl]-1,10-diamino-4,7-diazadecane.

The hindered amines substituted on the N-atom by a hydroxy-substituted alkoxy group are disclosed in copending application Ser. No. 09/257,711 whose relevant parts are also incorporated herein by reference.

The hindered amines substituted on the N-atom by a hydroxy-substituted alkoxy moiety which are useful in the instant invention include the following:

(a) 1-(2-hydroxy-2-methylpropoxy)-4-octadecanoyloxy-2,2,6,6-tetramethylpiperidine;

(b) 1-(2-hydroxy-2-methylpropoxy)-4-hydroxy-2,2,6,6-tetramethylpiperidine;

(c) 1-(2-hydroxy-2-methylpropoxy)-4-oxo-2,2,6,6-tetramethylpiperidine;

(d) bis(1-(2-hydroxy-2-methylpropoxy)-2,2,6,6-tetramethylpiperidin-4-yl) sebacate;

(e) bis(1-(2-hydroxy-2-methylpropoxy)-2,2,6,6-tetramethylpiperidin-4-yl) adipate;

(f) bis(1-(2-hydroxy-2-methylpropoxy)-2,2,6,6-tetramethylpiperidin-4-yl) succinate;

(g) bis(1-(2-hydroxy-2-methylpropoxy)-2,2,6,6-tetramethylpiperidin-4-yl) glutarate; and (h) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine.

Conventional hindered amines useful in the present invention include the following:

(a) bis(2,2,6,6-tetramethylpiperidin-4-yl) sebacate, (b) bis(1,2,2,6,6-pentamethylpiperidin-4-yl) sebacate, (c) di(1,2,2,6,6-pentamethylpiperidin-4-yl) (3,5-di-tert-butyl-4-hydroxybenzyl)butyl-malonate, (d) 4-benzoyl-2,2,6,6-tetramethylpiperidine, (e) 4-stearyloxy-2,2,6,6-tetramethylpiperidine, (f) tris(2,2,6,6-tetramethylpiperidin-4-yl) nitrilotriacetate, (g) polycondensation product of 2,4-dichloro-6-tert-octylamino-s-triazine and 4,4'-hexamethylenebis(amino-2,2,6,6-tetramethylpiperidine), (h) polycondensation product of 1-(2-hydroxyethyl)-2,2,6,6-tetramethyl-4-hydroxy-piperidine and succinic acid, (i) polycondensation product of 4,4'-hexamethylenebis-(amino-2,2,6,6-tetramethyl-piperidine) and 1,2-dibromoethane, (j) tetrakis(2,2,6,6-tetramethylpiperidin-4-yl) 1,2,3,4-butanetetracarboxylate, (k) tetrakis(1,2,2,6,6-pentamethylpiperidin-4-yl) 1,2,3,4-butanetetracarboxylate, (l) polycondensation product of 2,4-dichloro-6-morpholino-s-triazine and 4,4'-hexamethylenebis(amino-2,2,6,6-tetramethylpiperidine), (m) N,N',N",N'"-tetrakis[(4,6-bis(butyl-1,2,2,6,6-pentamethylpiperidin-4-yl)-amino-s-triazin-2-yl]-1,10-diamino-4,7-diazadecane, (n) octamethylene bis(2,2,6,6-tetramethylpiperidin-4-carboxylate), (o) N-2,2,6,6-tetramethylpiperidin-4-yl-n-dodecylsuccinimide, (p) N-1,2,2,6,6-pentamethylpiperidin-4-yl-n-dodecylsuccinimide, (q) N-1-acetyl-2,2,6,6-tetramethylpiperidin-4-yln-dodecylsuccinimide, (r) 4-$C_{15}$–$C_{17}$alkanoyloxy-2,2,6,6-tetramethylpiperidine, (s) polycondensation product of 2,4-dichloro-6-cyclohexylamino-s-triazine and 4,4'-hexamethylenebis(amino-2,2,6,6-tetramethylpiperidine), (t) 1,5-bis(2,2,6,6-tetramethylpiperidin-4-yl)-1,5-diaza-4-oxopropane, (u) copolymer of methyl methracrylate, ethyl acrylate and 2,2,6,6-tetramethylpiperidin-4-yl acrylate, (v) copolymer of N-octadecylmaleimide, styrene and N-(2,2,6,6-tetramethylpiperidin-4yl)maleimide, (w) 1,3,5-tris[3-(2,2,6,6-piperidin-4-ylamino)-2-hydroxy-propyl) isocyanurate, (x) olefin copolymer containing units derived from N-[2-(2,2,6,6-tetramethylpiperidin-4-yl)oxalamid-1-yl] maleimide, (y) 2,2,4,4-tetramethyl-7-oxa-3,20-diaza-21-oxo-dispiro[5,1,11,2]heneicosane, (z) $C_{12}$–$C_{14}$alkyl 3-(2,2,4,4-tetramethyl-7-oxa-3,20-diaza-21-oxo-dispiro[5,1,11,2]heneicosane-20-yl) propionate, (aa) reaction product of epichlorohydrin and 2,2,4,4-tetramethyl-7-oxa-3,20-diaza-21-oxo-dispiro[5,1,11,2] heneicosane, (bb) 1,3-di(2,2,6,6-tetramethylpiperidin-4-yl) 2,4-ditridecyl butanetetracarboxylate, (cc) 1,3-di(1,2,2,6,6-pentamethylpiperidin-4-yl) 2,4-ditridecyl butanetetracarboxylate, (dd) polycondensation product of 3,9-bis(1,1-dimethyl-2-hydroxyethyl)-2,4,8,10-tetraoxaspiro[5.5]undecane, tetramethyl 1,2,3,4-butanetetra-carboxylate and 2,2,6,6-tetramethyl-4-hydroxypiperidine.

(ee) polycondensation product of 3,9-bis(1,1-dimethyl-2-hydroxyethyl)-2,4,8,10-tetraoxaspiro[5.5]undecane, tetramethyl 1,2,3,4-butanetetra-carboxylate and 1,2,2,6,6-pentamethyl-4-hydroxypiperidine, (ff) 1,4-bis(2,2,6,6-tetramethylpiperidin-4-yl)-2,2-dimethyl-1,4-diaza-4-oxopropane, (gg) reaction product of 4-amino-2,2,6,6-tetramethylpiperidine and tetramethylol-acetylenediurea, (hh) 1,6-hexamethylenebis[N-formyl-N-(2,2,6,6-tetramethylpiperidin-4-yl)amine], (ii) copolymer of N-(2,2,6,6-tetramethylpiperdin-4-yl) maleimide and a $C_{20}$–$C_{24}$-alpha-olefin, (jj) poly[3-(2,2,6,6-tetramethylpiperidin-4-yloxy)propyl-methyl-siloxane], (kk) polycondensation product of 2,4-dichloro-6-[N-butyl-N-(2,2,6,6-tetramethylpiperidin-4-yl)amino]-s-triazine and 1,10-diamino-4,7-diazadecane, and (mm) dodecyl 3-(2,2,4,4-tetramethyl-7-oxa-3,20-diaza-21-oxo-dispiro[5,1,11,2]heneicosane-20-yl) propionate.

For instance, the conventional hindered amine useful in the present invention may include:

(a) bis(2,2,6,6-tetramethylpiperidin-4-yl) sebacate,
(b) bis(1,2,2,6,6-pentamethylpiperidin-4-yl) sebacate,
(c) di(1,2,2,6,6-pentamethylpiperidin-4-yl) (3,5-di-tert-butyl-4-hydroxybenzyl)butyl-malonate,
(g) polycondensation product of 2,4-dichloro-6-tert-octylamino-s-triazine and 4,4'-hexamethylenebis(amino-2,2,6,6-tetramethylpiperidine),
(h) polycondensation product of 1-(2-hydroxyethyl)-2,2,6,6-tetramethyl-4-hydroxy-piperidine and succinic acid, or
(m) N,N',N'',N'''-tetrakis[(4,6-bis(butyl-1,2,2,6,6-pentamethylpiperidin-4-yl)-amino-s-triazin-2-yl]-1,10-diamino-4,7-diazadecane.

It is also contemplated that mixtures of the N-alkoxy or cyclohexyloxy substituted hindered amines; mixtures of the N-hydroxy-alkoxy substituted hindered amines; and mixtures of these two types of hindered amines can be used in the instant invention. Indeed, mixtures of these types of hindered amines along with conventional hindered amines where the N-atom is substituted by hydrogen, alkyl, acyl and the like are also contemplated as being useful in this invention.

Additionally, the stabilized candle wax composition may also include at least one stabilizer selected from the group consisting of the phenolic antioxidants, organic phosphorus stabilizers, hydroxylamine stabilizers, nitrone stabilizers and amine oxide stabilizers.

Hydroxylamine stabilizers are disclosed in U.S. Pat. Nos. 4,590,231, 4,612,393, 4,649,221, 4,668,721, 4,691,015, 4,696,964, 4,703,073, 4,720,517, 4,757,102, 4,782,105, 4,831,134, 4,876,300, 5,006,577, 5,019,285, 5,064,883, 5,185,448 and 5,235,056.

Nitrone stabilizers are described in U.S. Pat. No. 4,898,901.

A specific amine oxide is for example Genox™ EP, a di($C_{16}$–$C_{18}$)alkyl methyl amine oxide, CAS# 204933-93-7.

U.S. Pat. Nos. 4,666,962, 4,666,963, 4,678,826, 4,753,972, 4,757,102, 4,760,179, 4,929,657, 5,057,563, 5,021,479, 5,045,583 and 5,185,448 disclose the use of various substituted hydroxylamine stabilizers towards the stabilization of organic materials.

U.S. Pat. Nos. 5,081,300, 5,162,408, 5,844,029, 5,880,191 and 5,922,794 disclose saturated hydrocarbon amine oxide stabilizers.

The effective amount of components (i) and (ii) in combination with the optional stabilizers selected from the hindered amine stabilizers, phenolic antioxidants, organic phosphorus stabilizers, hydroxylamine stabilizers, nitrone stabilizers and amine oxide stabilizers in the candle wax is about 0.01 to about 10% by weight based on the wax; for example about 0.1 to about 2% by weight based on the wax; for instance about 0.1 to about 0.5% by weight based on the wax.

Examples of such phenolic antioxidants and hydroxylamines include the following:
n-octadecyl 3,5-di-tert-butyl-4-hydroxyhydrocinnamate,
neopentanetetrayl tetrakis(3,5-di-tert-butyl-4-hydroxyhydrocinammate),
di-n-octadecyl 3,5-di-tert-butyl-4-hydroxybenzylphosphonate,
1,3,5-tris(3,5-di-tert-butyl-4-hydroxybenzyl)isocyanurate,
thiodiethylene bis(3,5-di-tert-butyl-4-hydroxyhydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol,
2,2'-ethylidene-bis(4,6-di-tert-butylphenol),
1,3,5-tris(2,6-dimethyl-4-tert-butyl-3-hydroxybenzyl) isocynurate,
1,1,3-tris(2-methyl-4-hydroxy-5-tert-butylphenyl)butane,
1,3,5-tris[2-(3,5-di-tert-butyl-4-hydroxyhydrocinnamoyloxy)ethyl] isocyanurate,
3,5-di-(3,5-di-tert-butyl-4-hydroxybenzyl)mesitol,
hexamethylene bis(3,5-di-tert-butyl-4-hydroxyhydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzylphosphonate),
ethylene bis[3,3-di(3-tert-butyl-4-hydroxyphenyl)butyrate],
octyl 3,5-di-tert-butyl-4-hydroxybenzylmercaptoacetate,
bis(3,5-di-tert-butyl-4-hydroxyhydrocinnamoyl)hydrazide,
N,N'-bis[2-(3,5-di-tert-butyl-4-hydroxyhydrocinnamoyloxy)-ethyl]oxamide, and
N,N-dialkylhydroxylamine prepared from di(hydrogenated tallow)amine by direct oxidation.

A most preferred phenolic antioxidant is
neopentanetetrayl tetrakis(3,5-di-tert-butyl-4-hydroxyhydrocinnamate),
n-octadecyl 3,5-di-tert-butyl-4-hydroxyhydrocinnamate,
1,3,5-trimethyl-2,4,6-tris(3,5-di-tert-butyl-4-hydroxybenzyl)benzene,
1,3,5-tris(3,5-di-tert-butyl-4-hydroxybenzyl)isocyanurate,
2,6-di-tert-butyl-p-cresol, or
2,2'-ethylidene-bis(4,6-di-tert-butylphenol).

In another embodiment, the metal of component (ii) is selected from groups 4, 9, 10, 12, 13 and 14 of the periodic table.

In still another embodiment, the metal of component (ii) is Ti, Ni, Zn, Al or Sn.

The metal of component (ii) in another embodiment is Sn.

The comparative test data given in the instant working Examples show clearly that a distilled benzotriazole UV absorber as seen in Example 2 has no discernible amount of tin present while the same benzotriazole UV absorber as manufactured, but not distilled, as seen in Example 1 still contains a residual amount (170 ppm) of tin content.

While the effectiveness of stabilizers will depend on the specific dye and/or scent present in the candle wax, inspection of the data given in the working Examples shows that the UV absorber of Example 1 (with tin present) is clearly more effective than the same UV absorber of Example 2 (with no discernible tin present). This is particularly demonstrated in working Examples 3–4 and 6. Examples 3 and 4 also show that even the excellent protection afforded by the UV absorber with tin present can be markedly improved by the concomitant presence of a hindered amine.

While the tin catalyst residue present in the benzotriazole of Example 1 is result of the manufacturing process to make the UV absorber, it is logical to ask the question whether one could merely add an appropriate metal (such as tin) compound to a benzotriazole UV absorber which did not contain any discernible residual tin and get the same results as shown in Examples 3–4 and 6. The answer is a resounding yes as testified by the results in Examples 20–24 wherein the benzotriazole UV absorber of Example 2 (without any discernible residual tin present) is strongly potentiated by the addition of a tin complex or even a simple tin salt per se or additionally in the presence of a hindered amine to give outstanding light protection to the candle wax.

It should be noted that candles contain a host of various components. The base materials may be made up of the following:
paraffin wax,
natural oils,
polyamide plus fatty acid/ester,
fatty acids such as stearin,
opacifiers,
beeswax,
glycerides plus oxidized wax,
alcohols, and
ethylene oligomers.

Candles also contain a number of additives such as the following:
mold release agents,
fragrances,
insect repellants or insecticides,
hardeners,
crystal modifiers,
clarifiers,
guttering reducers,
colorants,
f.p. control agents,
stretchability improvers,
gelling agents,
extrusion aids, and
vortex reducers.

Each of the various components are meant to control or modify the properties of the candle to insure proper burning, reduce channelling, aid in uniform melting, and the like. The colorants and fragrances obviously are there to provide the proper color, scent or other aesthetic appeal.

Of increasing importance are the transparent gel candles which look like clear glass, but which burn like a classical candle. As is discussed in detail in U.S. Pat. No. 5,879,694, the relevant parts of which are incorporated herein by reference, these gel candles usually contain a copolymer selected from the group consisting of a triblock, radial block, diblock or multiblock copolymer classically made up of at least two thermodynamically incompatible segments containing both hard and soft segments. Typical of such block copolymers is KRATON® (Shell Chemical Co.) which consists of block segments of styrene monomer units and rubber monomer or comonomer units. The most common structure found in KRATON® D series is a linear ABA block with styrene-butadiene-styrene (SBS) or styrene-isoprene-styrene (SIS).

Another object of the invention is to provide a method of stabilizing candle wax, which method comprises
adding to a candle wax composition an effective stabilizing amount of
(i) at least one compound selected from the group consisting of the UV absorbers; and
(ii) a metal compound wherein the metal is selected from groups 4, 6, 7, 8, 9 10, 11, 12, 13, 14, 15 and 16 of the periodic table; and
where the metal of component (ii) is from about 15 ppb to about 3400 ppm by weight based on the candle wax.

The metal compound of component (ii) of the present method of this invention is for example a UVA-metal complex or a UVA-metal salt, an organometallic compound such as a metal carboxylate or metal alkoxide, a metal salt, or the pure metal. The levels of metal discussed above are based on metal alone (on the metal itself).

Another object of the invention is to provide new benzotriazole-metal complex or benzotriazole-metal salt compounds of formula (I) or (II)

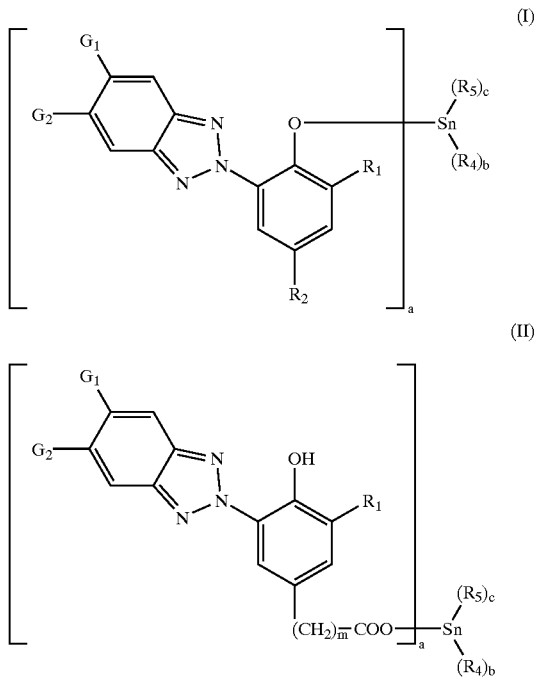

wherein
a, b and c are integers from 1 to 4 wherein a+b+c=4;
m is 0, 1 or 2;
$R_1$ is hydrogen, straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;
$R_2$ is straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;
$G_1$ is hydrogen or halogen;
$G_2$ is hydrogen, perfluoroalkyl of 1 to 12 carbon atoms, halogen, nitro, cyano, $R_3SO—$, $R_3SO_2—$, $—COOG_3$, $—P(O)(C_6H_5)_2$, $—CO—G_3$, $—CO—NH—G_3$, $—CO—N(G_3)_2$, $—N(G_3)—CO—G_3$,

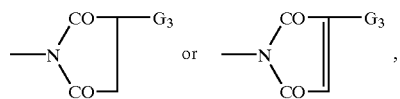

or $G_2$ is phenyl, naphthyl, biphenylyl, 9-phenanthryl or said phenyl, naphthyl, biphenylyl or 9-phenanthryl substituted by one to three alkyl of 1 to 18 carbon atoms, phenylalkyl of 7 to 15 carbon atoms, $R_3S—$, $R_3SO—$, $R_3SO_2$, aryl of 6 to 10 carbon atoms, perfluoroalkyl of 1 to 12 carbon atoms, halogen, nitro, cyano, carboxyl, alkoxycarbonyl of 2 to 19 carbon atoms, hydroxyl, alkoxy of 1 to 18 carbon atoms, aryloxy of 6 to 10 carbon atoms, aralkoxy of 7 to 15 carbon atoms, vinyl, acetyl, acetamido, amino, dialkylamino of 2 to 12 carbon atoms, formyl, thioalkoxy of 1 to 18 carbon atoms, hydroxymethyl, aminomethyl, halomethyl, sulfato, phosphato or where any two substituents form a benzo ring with the aryl moiety to which they are attached;

$G_3$ is hydrogen, straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

$R_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms;

$R_4$ is straight or branched chain alkyl of 1 to 18 carbon atoms, cycloalkyl of 5 to 12 carbon atoms, phenylalkyl of 7 to 15 carbon atoms or phenyl; and $R_5$ is straight or branched chain alkyl of 1 to 18 carbon atoms, cycloalkyl of 5 to 12 carbon atoms, phenylalkyl of 7 to 15 carbon atoms, phenyl, alkanoyloxy of 1 to 18 carbon atoms, alkylthio of 1 to 18 carbon atoms, alkoxycarbonylmethylthio where the alkyl group is from 1 to 18 carbon atoms, benzyl malonate or hydroxyl;

with the proviso that for a compound of formula (I), $G_2$ is not hydrogen or halogen when $G_1$ is hydrogen.

The compound of formula (I) or (II) is for example—

(a) 2,2'-{(dibutylstannylene)bis[oxy-(5-tert-octyl-2,1-phenylene)]}-bis-(5-trifluoromethyl-2H-benzotriazole); or (b) dibutyltin bis-[3-(5-chloro-2H-benzotriazol-2-yl)-5-tert-butyl-4-hydroxyhydrocinnamate].

The following examples are meant for illustrative purposes only and are not to be construed to limit the instant invention in any manner whatsoever.

Raw Materials

Fully refined wax with a melting point of 137–141° C. and <0.5% oil content is obtained from the Astor Wax Company.

Dyes are supplied by French Color and Chemical Corporation.

Wax samples are supplied by the Candle-Lite Corporation. These samples contain dyes and fragrances.

The UV absorbers and hindered amine stabilizers are obtained from the Ciba Speciality Chemicals Corporation.

Sample Preparation

The wax samples obtained from the Candle Corporation of America already contain a dye and a fragrance (scent). In these cases, the wax is melted and the appropriate stabilizer (s) is (are) added and dissolved in the molten wax. The stabilized wax is then poured into a mold (7"×8.5"×0.25"; 17.78 cm×21.59 cm×0.635 cm) giving a wax plaque.

To the wax samples obtained from the Astor Wax Company after melting are added 0.001% by weight of the test dyes to give a dyed candle wax base. To the dyed wax base after melting is (are) added the appropriate stabilizer(s). The melted stabilized and dyed wax is then poured into the mold described above to give a wax plaque.

Alternatively, the wax samples obtained from the Candle-Lite Corporation already contain a dye and a fragrance (scent). In these cases, the wax is melted and the appropriate stabilizer(s) is (are) added and dissolved in the molten wax. The stabilized wax is then poured into five (5) 44 mm diameter aluminum pans giving five (5) wax disks.

Sample Exposure

The wax plaques described above are cut into eight equal pieces (3.5"×2.125"; 8.89 cm×5.40 cm).

Triplicate samples of each disk or plaque are exposed under a bank of six (6) cool-white fluorescent lamps (40 watts) or under a bank of six (6) UV lamps having a wavelength of 368 nm with the test samples being twelve (12) inches (30.48 cm) below the lamps.

Dye color fade (or color change) is measured by a Macbeth ColorEye Spectrophotometer with a 6 inch integrating sphere. The conditions are: 10 degree observer; D65 illuminant and 8 degree viewing angle.

Initial color measurements are taken using the above parameters. The L, a and b values are calculated using the CIE system from the reflectance values. YI is calculated from the L, a and b values. Subsequent measurements are taken at specified intervals. Delta L, a, b and YI values are simply the difference between the initial values and the values at each interval. Delta($\Delta$) E is calculated as follows:

$$[(\text{Delta } L)^2+(\text{Delta } a)^2+(\text{Delta } b)^2]^{1/2}=\text{Delta } E.$$

EXAMPLE 1

Octyl 3-(2H-Benzotriazol-2-yl)-5-tert-butyl-4-hydroxyhydrocinnamate

Methyl 3-(2H-benzotriazol-2-yl)-5-tert-butyl-4-hydroxyhydrocinnamate (353 g, 1 mol), isooctanol (260 g, 2 mol, from Exxon) and dibutyltin oxide (0.5 g, 0.002 mol) are charged to a reaction flask and heated to 175° C. While heating to 175° C., a 300 mm Hg vacuum is applied. After holding at 175° C. for 30 minutes, the excess isooctanol is distilled by slowly reducing the pressure to <5 mm Hg. The desired product is cooled and discharged. The title compound is obtained in a yield of 451 g (100%) as a light yellow oil whose structure is verified by $^1$Hnmr and mass spectroscopy. The non-distilled product is analyzed by ICP (Inductively Coupled Plasma) for tin and is found to contain 170 ppm of tin.

EXAMPLE 2

Octyl 3-(2H-Benzotriazol-2-yl)-5-tert-butyl-4-hydroxyhydrocinnamate

When the product prepared in Example 1 is further purified by distillation, it is sold commercially as TINUVIN® 384 (CIBA). When this distilled material is analyzed for residual tin by ICP, it is found to contain <5 ppm of tin (below the detection limit of the analytical instrument).

The compounds of Example 1 and Example 2 are chemically identical except for the levels of tin in each example.

EXAMPLE 3

Color Fade of Red #C-15 Unscented Candle Wax Under Fluorescent Lamp Exposure

A variety of different stabilizers are evaluated in Red #C-15 unscented candle wax under fluorescent lamp exposure. The $\Delta$E values represent the change in color after the indicated days of exposure. A low $\Delta$E value indicates less change in color and is highly desired.

| Sample* (wt % add) | ΔE after 54.5 days |
|---|---|
| Blank (no add) | 33.71 |
| B (0.2%) | 26.66 |
| A (0.2%) | 14.92 |
| C (0.2%) | 5.02 |
| B (0.1%) + C (0.1%) | 4.87 |

*A is octyl 3-(benzotriazol-2-yl)-5-tert-butyl-4-hydroxyhydrocinnamate, TINUVIN ® 384, CIBA; compound of Example 2.
B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.

These data show that the combination of a UV absorber and a small amount of a tin complex or salt stabilizes the dye much better than the UV absorber alone. The combination of a UV absorber, a hindered amine and a metal complex or salt gives even better stabilization efficacy.

EXAMPLE 4

Color Fade of Red #C-15 Unscented Candle Wax Under UV Lamp Exposure

A variety of different stabilizers are evaluated in Red #C-15 unscented candle wax under UV lamp exposure. The ΔE values represent the change in color after the indicated days of exposure. A low ΔE value indicates less change in color and is highly desired.

| Sample* (wt % add) | ΔE after 46.2 days |
|---|---|
| Blank (no add) | 33.37 |
| A (0.2%) | 15.86 |
| B (0.2%) | 31.03 |
| C (0.2%) | 10.19 |
| B (0.1%) + C (0.1%) | 4.75 |

*A is octyl 3-(benzotriazol-2-yl)-5-tert-butyl-4-hydroxyhydrocinnamate, TINUVIN ® 384, CIBA; compound of Example 2.
B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.

These data show that the combination of a UV absorber and a small amount of a tin complex or salt stabilizes the dye much better than the UV absorber alone. The combination of a UV absorber, a hindered amine and a metal complex or salt gives even better stabilization efficacy.

EXAMPLE 5

Color Fade of Yellow #C-47 Unscented Candle Wax Under Fluorescent Lamp Exposure

A variety of different stabilizers are evaluated in Yellow #C-47 unscented candle wax under fluorescent lamp exposure. The ΔE values represent the change in color after the indicated days of exposure. A low ΔE value indicates less change in color and is highly desired.

| Sample* (wt % add) | ΔE after 9.1 days |
|---|---|
| Blank (no add) | 1.17 |
| A (0.2%) | 0.60 |
| C (0.2%) | 0.37 |
| B (0.1%) + C (0.1%) | 0.35 |

*A is octyl 3-(benzotriazol-2-yl)-5-tert-butyl-4-hydroxyhydrocinnamate, TINUVIN ® 384, CIBA; compound of Example 2.
B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.

These data show that the combination of a UV absorber and a small amount of a tin complex or salt stabilizes the dye much better than the UV absorber alone. The combination of a UV absorber, a hindered amine and a metal complex or salt gives similar stabilization efficacy.

EXAMPLE 6

Color Fade of Yellow #C-47 Unscented Candle Wax Under UV Lamp Exposure

A variety of different stabilizers are evaluated in Yellow #C-47 unscented candle wax under UV lamp exposure at 368 nm wavelength. The ΔE values represent the change in color after the indicated days of exposure. A low ΔE value indicates less change in color and is highly desired.

| Sample* (wt % add) | ΔE after 89.7 days |
|---|---|
| Blank (no add) | 15.00 |
| A (0.2%) | 10.06 |
| C (0.2%) | 1.75 |

*A is octyl 3-(benzotriazol-2-yl)-5-tert-butyl-4-hydroxyhydrocinnamate, TINUVIN ® 384, CIBA; compound of Example 2.
C is octyl 3-(benzotriazol-2-yl)-5-tert-butyl-4-hydroxyhydrocinnamate, TINUVIN ® 99, CIBA; compound of Example 1.

These data show that the combination of a UV absorber and a small amount of a tin complex or salt stabilizes the dye much better than the UV absorber alone.

EXAMPLE 7

Color Fade of Blue #C-19 Unscented Candle Wax Under Fluorescent Lamp Exposure

A variety of different stabilizers are evaluated in Blue #C-19 unscented candle wax under fluorescent lamp exposure. The ΔE values represent the change in color after the indicated days of exposure. A low ΔE value indicates less change in color and is highly desired.

| Sample* (wt % add) | ΔE after 47.5 days |
|---|---|
| Blank (no add) | 43.83 |
| D (0.2%) | 13.83 |
| A (0.2%) | 9.13 |
| C (0.2%) | 8.05 |

-continued

| Sample* (wt % add) | ΔE after 47.5 days |
|---|---|
| C (0.1%) + D (0.1%) | 3.48 |

*A is octyl 3-(benzotriazol-2-yl)-5-tert-butyl-4-hydroxyhydrocinnamate, TINUVIN ® 384, CIBA; compound of Example 2.
C is octyl 3-(benzotriazol-2-yl)-5-tert-butyl-4-hydroxyhydrocinnamate, TINUVIN ® 99, CIBA; compound of Example 1.
D is bis(1-octyloxy-2,2,6,6-tetramethylpiperidin-4-yl) sebacate, TINUVIN ® 123, CIBA.

These data show that the combination of a UV absorber and a small amount of a tin complex or salt stabilizes the dye much better than the UV absorber alone. The combination of a UV absorber, a hindered amine and a metal complex or salt gives even better stabilization efficacy.

EXAMPLE 8

Color Fade of Blue #C-19 Unscented Candle Wax Under UV Lamp Exposure

A variety of different stabilizers are evaluated in Blue #C-19 unscented candle wax under UV lamp exposure at 368 nm wavelength. The ΔE values represent the change in color after the indicated days of exposure. A low ΔE value indicates less change in color and is highly desired.

| Sample* (wt % add) | ΔE after 33.4 days |
|---|---|
| Blank (no add) | 26.79 |
| A (0.2%) | 6.45 |
| B (0.2%) | 6.97 |
| C (0.2%) | 5.78 |
| B (0.1%) + C (0.1%) | 1.88 |

*A is octyl 3-(benzotriazol-2-yl)-5-tert-butyl-4-hydroxyhydrocinnamate, TINUVIN ® 384, CIBA; compound of Example 2.
B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.

These data show that the combination of a UV absorber and a small amount of a tin complex or salt stabilizes the dye much better than the UV absorber alone. The combination of a UV absorber, a hindered amine and a metal complex or salt gives even better stabilization efficacy.

EXAMPLE 9

Discoloration Prevention of White Unscented Candle Wax Under UV Lamp Exposure

The white candles of this experiment have no dye or pigment. The white color is from crystallized wax. White candles on aging undergo discoloration to yellow or brown. A variety of different stabilizers are evaluated in white unscented candle wax under UV lamp exposure at 368 nm wavelength. The ΔE values represent the change in color after the indicated days of exposure. A low ΔE value indicates less change in color and is highly desired.

| Sample* (wt % add) | ΔE after 96.79 days |
|---|---|
| Blank (no add) | 1.66 |
| E (0.1%) + F (0.1%) | 1.10 |
| B (0.1%) + C (0.1%) | 1.00 |
| C (0.1%) + D (0.1%) | 0.85 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
D is bis(1-octyloxy-2,2,6,6-tetramethylpiperidin-4-yl) sebacate, TINUVIN ® 123, CIBA.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber and a small amount of a tin complex or salt stabilizes the dye much better than the UV absorber alone. The combination of a UV absorber, a hindered amine and a metal complex or salt gives even better stabilization efficacy.

EXAMPLE 10

Color Change of Yellow Scented Candle Wax Under Fluorescent Lamp Exposure

A variety of different stabilizers are evaluated in yellow scented candle wax, obtained from the Candle Corporation of America, under fluorescent lamp exposure. The ΔE values represent the change in color after the indicated days of exposure. A low ΔE value indicates less change in color and is highly desired.

| Sample* (wt % add) | ΔE after 14 days |
|---|---|
| Blank (no add) | 8.36 |
| E (0.2%) | 6.87 |
| C (0.1%) + D (0.1%) | 5.82 |

*C is octyl 3-(benzotriazol-2-yl)-5-tert-butyl-4-hydroxyhydrocinnamate, TINUVIN ® 99, CIBA; compound of Example 1.
D is bis(1-octyloxy-2,2,6,6-tetramethylpiperidin-4-yl) sebacate, TINUVIN ® 123, CIBA.
E is 2-(2-hydroxy-5-tert-octylphenyl)-2H-benzotriazole, TINUVIN ® 329, CIBA.

These data show that the combination of a UV absorber, a hindered amine and a metal complex or salt gives superior stabilization efficacy compared to a UV absorber alone.

EXAMPLE 11

Color Change of Yellow Scented Candle Wax Under UV Lamp Exposure

A variety of different stabilizers are evaluated in yellow scented candle wax, obtained from the Candle Corporation of America, under UV lamp exposure at 368 nm wavelength. The ΔE values represent the change in color after the indicated days of exposure. A low ΔE value indicates less change in color and is highly desired.

| Sample* (wt % add) | ΔE after 15 days |
|---|---|
| Blank (no add) | 5.06 |
| E (0.2%) | 5.05 |
| F (0.2%) | 5.92 |
| B (0.1%) + C (0.1%) | 3.30 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy.

EXAMPLE 12

Color Fade of Red Scented Candle Wax Under UV Lamp Exposure

A variety of different stabilizers are evaluated in red scented candle wax, obtained from the Candle Corporation of America, under UV lamp exposure at 368 nm wavelength. The ΔE values represent the change in color after the indicated days of exposure. A low ΔE value indicates less change in color and is highly desired.

| Sample* (wt % add) | ΔE after 60 days |
|---|---|
| Blank (no add) | 52.98 |
| E (0.2%) | 9.93 |
| F (0.2%) | 14.48 |
| B (0.1%) + C (0.1%) | 6.31 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy.

EXAMPLE 13

Color Fade of Green Scented Candle Wax Under Fluorescent Lamp Exposure

A variety of different stabilizers are evaluated in green scented candle wax, obtained from the Candle Corporation of America, under fluorescent lamp exposure. The ΔE values represent the change in color after the indicated days of exposure. A low ΔE value indicates less change in color and is highly desired.

| Sample* (wt % add) | ΔE after 20.7 days |
|---|---|
| Blank (no add) | 8.06 |
| F (0.2%) | 5.04 |
| E (0.2%) | 4.83 |
| B (0.1%) + C (0.1%) | 1.78 |
| D (0.1%) + C (0.1%) | 1.40 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
D is bis(1-octyloxy-2,2,6,6-tetramethylpiperidin-4-yl) sebacate, TINUVIN ® 123, CIBA.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy.

EXAMPLE 14

Color Fade of Green Scented Candle Wax Under UV Lamp Exposure

A variety of different stabilizers are evaluated in green scented candle wax, obtained from the Candle Corporation of America, under UV lamp exposure at 368 nm wavelength. The ΔE values represent the change in color after the indicated days of exposure. A low ΔE value indicates less change in color and is highly desired.

| Sample* (wt % add) | ΔE after 11 days |
|---|---|
| Blank (no add) | 7.69 |
| F (0.2%) | 5.89 |
| F (0.1%) + E (0.1%) | 2.71 |
| B (0.1%) + C (0.1%) | 0.72 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy.

EXAMPLE 15

Color Fade of Blue Scented Candle Wax Under Fluorescent Lamp Exposure

A variety of different stabilizers are evaluated in blue scented candle wax, obtained from the Candle Corporation of America, under fluorescent lamp exposure. The ΔE values represent the change in color after the indicated days of exposure. A low ΔE value indicates less change in color and is highly desired.

| Sample* (wt % add) | ΔE after 20.7 days |
|---|---|
| Blank (no add) | 9.69 |
| F (0.2%) | 6.28 |
| E (0.2%) | 6.68 |
| E (0.1%) + F (0.1%) | 6.30 |
| B (0.1%) + C (0.1%) | 5.64 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy.

EXAMPLE 16

Color Fade of Blue Scented Candle Wax Under UV Lamp Exposure

A variety of different stabilizers are evaluated in blue scented candle wax, obtained from the Candle Corporation of America, under UV lamp exposure at 368 nm wavelength. The ΔE values represent the change in color after the indicated days of exposure. A low ΔE value indicates less change in color and is highly desired.

| Sample* (wt % add) | ΔE after 46.3 days |
|---|---|
| Blank (no add) | 43.44 |
| F (0.2%) | 21.85 |
| F (0.1%) + E (0.1%) | 18.59 |
| B (0.1%) + C (0.1%) | 9.69 |
| D (0.1%) + C (0.1%) | 8.05 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
D is bis(1-octyloxy-2,2,6,6-tetramethylpiperidin-4-yl) sebacate, TINUVIN ® 123, CIBA.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy.

EXAMPLE 17

Color Change of Gray Scented Candle Wax Under Fluorescent Lamp Exposure

A variety of different stabilizers are evaluated in gray scented candle wax, obtained from the Candle Corporation of America, under fluorescent lamp exposure. The ΔE values represent the change in color after the indicated days of exposure. A low ΔE value indicates less change in color and is highly desired.

| Sample* (wt % add) | ΔE after 44.8 days |
|---|---|
| Blank (no add) | 16.93 |
| E (0.1%) + F (0.1%) | 11.71 |
| E (0.1%) + B (0.1%) | 4.43 |
| B (0.1%) + C (0.1%) | 2.17 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy, even better than a combination of a UV absorber and a hindered amine.

EXAMPLE 18

Color Change of Pink Scented Candle Wax Under Fluorescent Lamp Exposure

A variety of different stabilizers are evaluated in pink scented candle wax, obtained from the Candle Corporation of America, under fluorescent lamp exposure. The ΔE values represent the change in color after the indicated days of exposure. A low ΔE value indicates less change in color and is highly desired.

| Sample* (wt % add) | ΔE after 22.3 days |
|---|---|
| Blank (no add) | 12.12 |
| E (0.1%) + F (0.1%) | 5.94 |
| E (0.1%) + B (0.1%) | 1.17 |
| B (0.1%) + C (0.1%) | 1.09 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy, even better than a combination of a UV absorber and a hindered amine.

EXAMPLE 19

Color Change of Gray Scented Candle Wax Under UV Lamp Exposure

A variety of different stabilizers are evaluated in gray scented candle wax, obtained from the Candle Corporation of America, under UV lamp exposure. The ΔE values represent the change in color after the indicated days of exposure. A low ΔE value indicates less change in color and is highly desired.

| Sample* (wt % add) | ΔE after 22.6 days |
|---|---|
| Blank (no add) | 30.07 |
| F (0.1%) + E (0.1%) | 10.96 |
| B (0.1%) + E (0.1%) | 3.83 |
| B (0.1%) + C (0.1%) | 3.72 |

*B is bis(1,2,2,6,6-pentamethylpiperidin-4-yl) sebacate, TINUVIN ® 292, CIBA.
C is octyl 3-(benzotriazol-2-yl)-5-tert-butyl-4-hydroxyhydrocinnamate, TINUVIN ® 99, CIBA; compound of Example 1.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.

These data show that the combination of a UV absorber, a hindered amine and a metal complex or salt gives superior stabilization efficacy, even better than a combination of a UV absorber and a hindered amine.

EXAMPLE 20

Color Fade of Pink Scented Candle Wax Under Fluorescent Lamp Exposure

A variety of different stabilizers are evaluated in pink scented candle wax, obtained from the Candle Corporation of America, under fluorescent lamp exposure. The ΔE values represent the change in color after the indicated days of exposure. A low ΔE value indicates less change in color and is highly desired.

| Sample* (wt % add) | ΔE after 61.4 days |
|---|---|
| Blank (no add) | 17.12 |
| A (0.3%) | 14.34 |
| E (0.15%) + F (0.15%) | 10.43 |
| A (0.15%) + G (0.15%) | 4.70 |

*A is octyl 3-(benzotriazol-2-yl)-5-tert-butyl-4-hydroxyhydrocinnamate, TINUVIN ® 384 CIBA; compound of Example 2.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.
G is 2,2'-{(dibutylstannylene)bis[oxy-(5-tert-octyl-2,1-phenylene)]}-bis-(5-trifluoromethyl-2H-benzotriazole), the compound of Example 26.

These data show that the combination of a UV absorber and a metal complex or salt gives superior stabilization efficacy.

EXAMPLE 21

Color Fade of Pink Scented Candle Wax Under UV Lamp Exposure

A variety of different stabilizers are evaluated in pink scented candle wax, obtained from the Candle Corporation of America, under UV lamp exposure at 368 nm wavelength. The ΔE values represent the change in color after the indicated days of exposure. A low ΔE value indicates less change in color and is highly desired.

| Sample* (wt % add) | ΔE after 64.5 days |
|---|---|
| Blank (no add) | 23.92 |
| F (0.15%) + E (0.15%) | 12.99 |
| A (0.3%) | 10.31 |
| B (0.15%) + E (0.15%) | 4.84 |
| A (0.15%) + G (0.15%) | 4.55 |

*A is octyl 3-(benzotriazol-2-yl)-5-tert-butyl-4-hydroxyhydrocinnamate, TINUVIN ® 384, CIBA; compound of Example 2.
B is bis(1,2,2,6,6-pentamethylpiperidin-4-yl) sebacate, TINUVIN ® 292, CIBA.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.
G is 2,2'-{(dibutylstannylene)bis[oxy-(5-tert-octyl-2,1-phenylene)]}-bis-(5-trifluoromethyl-2H-benzotriazole), the compound of Example 26.

These data show that the combination of a UV absorber and a metal complex or salt gives superior stabilization efficacy.

EXAMPLE 22

Color Change of Gray Scented Candle Wax Under UV Lamp Exposure

A variety of different stabilizers are evaluated in gray scented candle wax, obtained from the Candle Corporation of America, under UV lamp exposure. The ΔE values represent the change in color after the indicated days of exposure. A low ΔE value indicates less change in color and is highly desired.

| Sample* (wt % add) | ΔE after 59.8 days |
|---|---|
| Blank (no add) | 30.10 |
| F (0.15%) + E (0.15%) | 13.16 |
| A (0.3%) | 12.39 |
| H (0.3%) | 6.94 |
| A (0.1%) + D (0.1% + I (0.1%) | 5.91 |
| A (0.1%) + D (0.1%) + J (0.1%) | 5.03 |

*A is octyl 3-(benzotriazol-2-yl)-5-tert-butyl-4-hydroxyhydrocinnamate, TINUVIN ® 384, CIBA; compound of Example 2.
D is bis(1-octyloxy-2,2,6,6-tetramethylpiperidin-4-yl) sebacate, TINUVIN ® 123, CIBA.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.
H is dibutyltin bis-[3-(5-chloro-2H-benzotriazol-2-yl)-5-tert-butyl-4-hydroxyhydrocinnamate], the compound of Example 27.
I is dibutyltin dilaurate (Aldrich Chemical).
J is dibutyltin dimethoxide (Aldrich Chemical).

These data show that the combination of a UV absorber, a hindered amine and a metal compund gives superior stabilization efficacy.

EXAMPLE 23

Discoloration Prevention of White Scented Candle Wax Under Fluorescent Lamp Exposure A variety of different stabilizers are evaluated in white scented candle wax, obtained from the Candle Corporation of America, under fluorescent lamp exposure. The ΔE values represent the change in color after the indicated days of exposure. A low ΔE value indicates less change in color and is highly desired.

| Sample* (wt % add) | ΔE after 20.6 days |
|---|---|
| Blank (no add) | 33.32 |
| A (0.3%) | 27.70 |
| E (0.15%) + B (0.15%) | 24.16 |
| E (0.15%) + F (0.15%) | 18.42 |
| A (0.15%) + G (0.15%) | 11.34 |
| A (0.1%) + D (0.1%) + I (0.1%) | 9.58 |

*A is octyl 3-(benzotriazol-2-yl)-5-tert-butyl-4-hydroxyhydrocinnamate, TINUVIN ® 384 CIBA; compound of Example 2.
B is bis(1,2,2,6,6-pentamethylpiperidin-4-yl) sebacate, TINUVIN ® 292, CIBA.
D is bis(1-octyloxy-2,2,6,6-tetramethylpiperidin-4-yl) sebacate, TINUVIN ® 123, CIBA.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.
G is 2,2'-{(dibutylstannylene)bis[oxy-(5-tert-octyl-2,1-phenylene)]}-bis-(5-trifluoromethyl-2H-benzotriazole), the compound of Example 26.
I is dibutyltin dilaurate (Aldrich Chemical).

These data show that the combination of a UV absorber, a hindered amine and a metal compound gives superior stabilization efficacy, even better than the combination of a UV absorber and a hindered amine.

EXAMPLE 24

Discoloration Prevention of White Scented Candle Wax Under UV Lamp Exposure

A variety of different stabilizers are evaluated in white scented candle wax, obtained from the Candle Corporation of America, under UV lamp exposure. The ΔE values represent the change in color after the indicated days of exposure. A low ΔE value indicates less change in color and is highly desired.

| Sample* (wt % add) | ΔE after 11.8 days |
|---|---|
| Blank (no add) | 45.50 |
| E (0.15%) + B (0.15%) | 26.36 |
| E (0.15%) + F (0.15%) | 27.24 |
| A (0.15%) + G (0.15%) | 16.06 |
| H (0.3%) | 16.04 |
| A (0.1%) + D (0.1%) + I (0.1%) | 14.20 |

*A is octyl 3-(benzotriazol-2-yl)-5-tert-butyl-4-hydroxyhydrocinnamate, TINUVIN ® 384 CIBA; compound of Example 2.
B is bis(1,2,2,6,6-pentamethylpiperidin-4-yl) sebacate, TINUVIN ® 292, CIBA.
D is bis(1-octyloxy-2,2,6,6-tetramethylpiperidin-4-yl) sebacate, TINUVIN ® 123, CIBA.
E is 2-(2-hydroxy-5-tert-octylphenyl)-2H-benzotriazole, TINUVIN ® 329, CIBA.
F is 4-octyloxy-2-hydroxybenzophenone, CHIMMASORB ® 81, CIBA.
G is 2,2'-{(dibutylstannylene)bis[oxy-(5-tert-octyl-2,1-phenylene)]}-bis-(5-trifluoromethyl-2H-benzotriazole), the compound of Example 26.
H is dibutyltin bis-[3-(5-chloro-2H-benzotriazol-2-yl)-5-tert-butyl-4-hydroxyhydrocinnamate], the compound of Example 27.
I is dibutyltin dilaurate (Aldrich Chemical).

These data show that the combination of a UV absorber, a hindered amine and a metal compound gives superior stabilization efficacy, even better than the combination of a UV absorber and a hindered amine.

EXAMPLE 25

2,2'-{(Dibutylstannylene)bis[oxy-(5-tert-octyl-2,1-phenylene)]}-bis-(2H-benzotriazole)

2-(2-Hydroxy-5-tert-octylphenyl)-2H-benzotriazole (64.6 g, 0.2 mol, TINUVIN® 329, CIBA), dibutyltin oxide (24.89 g, 0.1 mol) and toluene are charged to a laboratory reactor and the contents are heated to reflux and refluxed for seven hours. About half of the amount of toluene is removed by distillation. The reaction mass is cooled to 0–5° C. after the addition of 200 g of hexane. Any unreacted TINUVIN® 329 and dibutyltin oxide are removed by filtration. The solvent is then removed by distillation to yield the title compound (38 g, 43.3% yield) as a yellow resin whose structure is consistent with $^1$Hnmr analysis.

| Analysis: | Calc'd for $C_{48}H_{66}N_6O_2Sn$: | Sn, 13.52. |
|---|---|---|
| | Found: | Sn, 13.80. |

EXAMPLE 26

2,2'-{(Dibutylstannylene)bis[oxy-(5-tert-octyl-2,1-phenylene)]}-bis-(5-trifluoromethyl-2H-benzotriazole)

Following the synthetic procedure of Example 25, the title compound is prepared by reaction of the corresponding equivalent amounts of 5-trifluoromethyl-2-(2-hydroxy-5-tert-octylphenyl)-2H-benzotriazole and dibutyltin oxide to give the title compound as a yellow resin (38 g, 99% yield) whose structure is consistent with $^1$Hnmr and $^{19}$Fnmr.

| Analysis: | Calc'd for $C_{50}H_{64}F_6N_6O_2Sn$: | Sn, 11.71. |
|---|---|---|
| | Found: | Sn, 10.60. |

EXAMPLE 27

Dibutyltin Bis-[3-(5-chloro-2H-benzotriazol-2-yl)-5-tert-butyl-4-hydroxyhydrocinnamate]

Following the synthetic procedure of Example 25, the title compound is prepared by reaction of the corresponding equivalent amounts of 3-(5-chloro-2H-benzotriazol-2-yl)-5-tert-butyl-4-hydroxyhydrocinnamic acid and dibutyltin oxide to give the title compound as a yellow resin (47.24 g, 97.6% yield) whose structure is consistent with $^1$Hnmr.

| Analysis: | Calc'd for $C_{46}H_{56}Cl_2N_6O_6Sn$: | Sn, 12.13. |
|---|---|---|
| | Found: | Sn, 11.40. |

What is claimed is:

1. A benzotriazole-metal complex or benzotriazole-metal salt compound of formula (I) or (II)

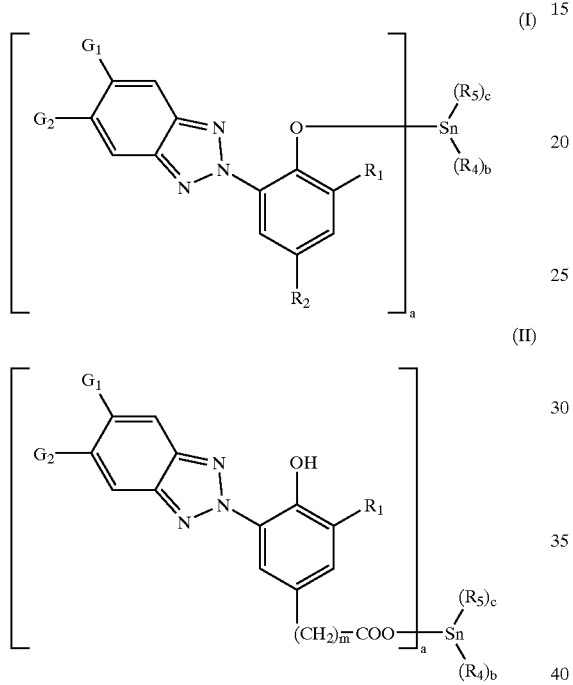

wherein a, b and c are integers from 1 to 4 wherein a+b+c=4;
m is 0, 1 or 2;

$R_1$ is hydrogen, straight or branched chain alkyl of 1 to 24 carbon atoms, straight of branched chain alkenyl of 2 to 18 carbon atoms, cycloalkyl of 5 to 12 carbon atoms, phenylalkyl 7 to 15 carbon atoms, phenyl, or said phenyl or said phenylalkyl substituted on the phenyl ring by 1 to 4 alkyl of 1 to 4 carbon atoms;

$R_2$ is straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

$G_1$ is hydrogen or halogen;

$G_2$ is perfluoroalkyl of 1 to 12 carbon atoms, nitro, cyano, $R_3SO-$, $R_3SO_2-$, $-COOG_3$, $-P(O)(C_6H_5)_2$, $-CO-G_3$, $-CO-NH-G_3$, $-CO-N(G_3)_2$, $-N(G_3)-CO-G_3$,

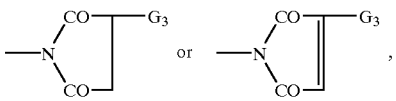

or $G_2$ is phenyl, naphthyl, biphenylyl, 9-phenanthryl or said phenyl, naphthyl, biphenylyl or 9-phenanthryl substituted by one to three alkyl of 1 to 18 carbon atoms, phenylalkyl of 7 to 15 carbon atoms, $R_3S-$, $R_3SO-$, $R_3SO_2$, aryl of 6 to 10 carbon atoms, perfluoroalkyl of 1 to 12 carbon atoms, halogen, nitro, cyano, carboxyl, alkoxycarbonyl of 2 to 19 carbon atoms, hydroxyl, alkoxy of 1 to 18 carbon atoms, aryloxy of 6 to 10 carbon atoms, aralkoxy of 7 to 15 carbon atoms, vinyl, acetyl, acetamido, amino, dialkylamino of 2 to 12 carbon atoms, formyl, thioalkoxy of 1 to 18 carbon atoms, hydroxymethyl, aminomethyl, halomethyl, sulfato, phosphato or where any two substituents form a benzo ring with the aryl moiety to which they are attached;

$G_3$ is hydrogen, straight or branched chain alkyl of 1 to 24 carbon atoms, straight of branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

$R_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms;

$R_4$ is straight or branched chain alkyl of 1 to 18 carbon atoms, cycloalkyl of 5 to 12 carbon atoms, phenylalkyl of 7 to 15 carbon atoms or phenyl; and $R_5$ is straight or branched chain alkyl of 1 to 18 carbon atoms, cycloalkyl of 5 to 12 carbon atoms, phenylalkyl of 7 to 15 carbon atoms, phenyl, alkanoyloxy of 1 to 18 carbon atoms, alkylthio of 1 to 18 carbon atoms, alkoxycarbonylmethylthio where the alkyl group is from 1 to 18 carbon atoms, benzyl malonate or hydroxyl.

2. A compound according to claim 1 of formula (I) or (II) wherein $R_4$ and $R_5$ are alkyl of 4 to 8 carbon atoms.

3. A compound according to claim 2 of formula (I) or (II) wherein $R_4$ and $R_5$ are butyl or octyl.

4. A compound according to claim 1 which is
   (a) 2,2'-{(dibutylstannylene)bis[oxy-(5-tert-octyl-2,1-phenylene)]}-bis-(5-trifluoromethyl-2H-benzotriazole); or
   (b) dibutyltin bis-[3-(5-chloro-2H-benzotriazol-2-yl)-5-tert-butyl-4-hydroxyhydrocinnamate].

* * * * *